United States Patent
Uçar et al.

(10) Patent No.: US 11,473,900 B2
(45) Date of Patent: Oct. 18, 2022

(54) MEASUREMENT OF OXIDE THICKNESS ON ALUMINUM SURFACE BY FTIR SPECTROSCOPY AND CHEMOMETRICS METHOD

(71) Applicant: ASSAN ALUMINYUM SAN. VE TIC. A. S., Istanbul (TR)

(72) Inventors: Özlem Uçar, Istanbul (TR); Durmus Özdemir, Izmir (TR); Mustafa Murat Dündar, Istanbul (TR)

( * ) Notice: Subject to any disclaimer, the term of this patent is extended or adjusted under 35 U.S.C. 154(b) by 332 days.

(21) Appl. No.: 16/068,801

(22) PCT Filed: Jul. 3, 2017

(86) PCT No.: PCT/TR2017/050298
§ 371 (c)(1),
(2) Date: Jul. 9, 2018

(87) PCT Pub. No.: WO2018/017032
PCT Pub. Date: Jan. 25, 2018

(65) Prior Publication Data
US 2021/0207944 A1    Jul. 8, 2021

(30) Foreign Application Priority Data
Jul. 21, 2016  (TR) ................... 2016/10172

(51) Int. Cl.
*G01B 11/06* (2006.01)
*G01N 21/84* (2006.01)
*G01N 21/35* (2014.01)

(52) U.S. Cl.
CPC .......... *G01B 11/06* (2013.01); *G01N 21/8422* (2013.01); *G01N 2021/3595* (2013.01)

(58) Field of Classification Search
CPC .............. G01B 11/06; G01N 21/8422; G01N 2021/3595
USPC ........ 356/630, 632, 326, 445, 446, 432, 217
See application file for complete search history.

(56) References Cited

U.S. PATENT DOCUMENTS

| | | | |
|---|---|---|---|
| 5,285,066 A | 2/1994 | Sekine et al. | |
| 5,358,333 A * | 10/1994 | Schmidt ............. | G01B 11/0658 374/45 |
| 5,604,581 A * | 2/1997 | Liu ..................... | G01B 11/0625 356/73 |
| 6,204,922 B1 * | 3/2001 | Chalmers ........... | G01B 11/0616 451/6 |

(Continued)

FOREIGN PATENT DOCUMENTS

| | | |
|---|---|---|
| EP | 0512313 A2 | 11/1992 |
| EP | 2573545 A1 | 3/2013 |
| JP | 2001348211 A | 12/2001 |

OTHER PUBLICATIONS

International Preliminary Report on Patentability for corresponding PCT/TR2017/050298, dated Jan. 22, 2019.

(Continued)

*Primary Examiner* — Isiaka O Akanbi
(74) *Attorney, Agent, or Firm* — Egbert, McDaniel & Swartz, PLLC

(57) ABSTRACT

The invention relates to a measurement method enabling on-line thickness measurement of the oxide layer formed on aluminum foil by FTIR spectrometer at low cost and precise manner, during aluminum-containing material production.

1 Claim, 4 Drawing Sheets

(56) References Cited

U.S. PATENT DOCUMENTS

| | | | |
|---|---|---|---|
| 6,392,756 B1* | 5/2002 | Li | G01B 11/0641 |
| | | | 356/504 |
| 6,567,678 B1* | 5/2003 | Oosta | A61B 5/14558 |
| | | | 600/316 |
| 6,573,999 B1 | 6/2003 | Yang | |
| 6,794,651 B2* | 9/2004 | Shelley | G01B 11/0616 |
| | | | 250/341.1 |
| 2003/0073255 A1* | 4/2003 | Narayanan | H01L 22/12 |
| | | | 438/770 |
| 2006/0188062 A1* | 8/2006 | Agnihotri | G01N 23/20 |
| | | | 378/70 |
| 2010/0032571 A1 | 2/2010 | Shelley | |
| 2011/0139990 A1 | 6/2011 | Xie et al. | |
| 2016/0153769 A1* | 6/2016 | Pareschi | B24B 49/12 |
| | | | 356/503 |
| 2017/0270225 A1* | 9/2017 | Chen | G06F 16/00 |
| 2019/0285611 A1* | 9/2019 | Lednev | G01N 21/3577 |

OTHER PUBLICATIONS

Written Opinion of the International Searching Authority for corresponding PCT/TR2017/050298, dated Nov. 28, 2017.

* cited by examiner

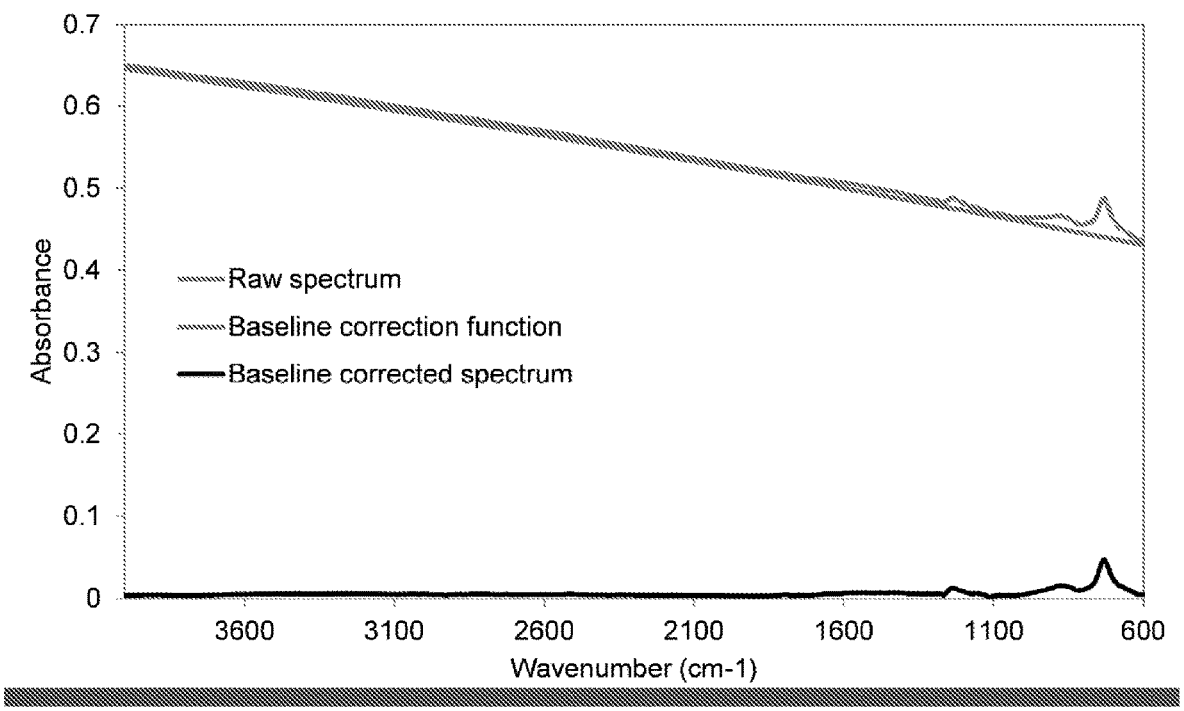
Figure 3.A
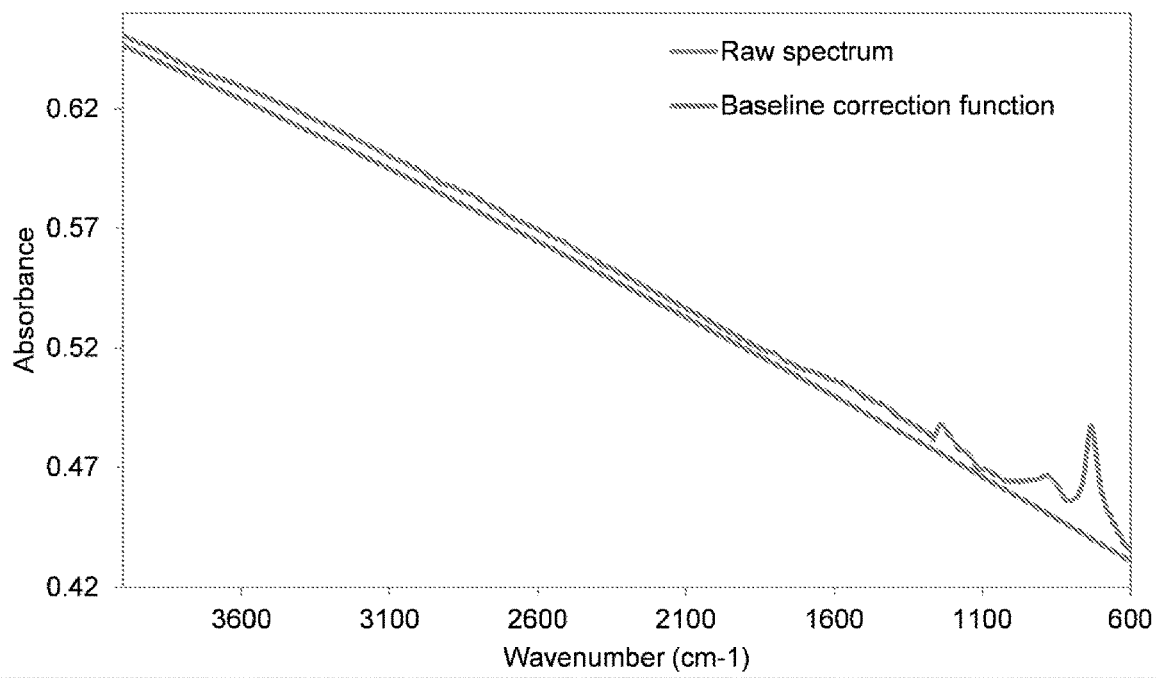
Figure 3.B

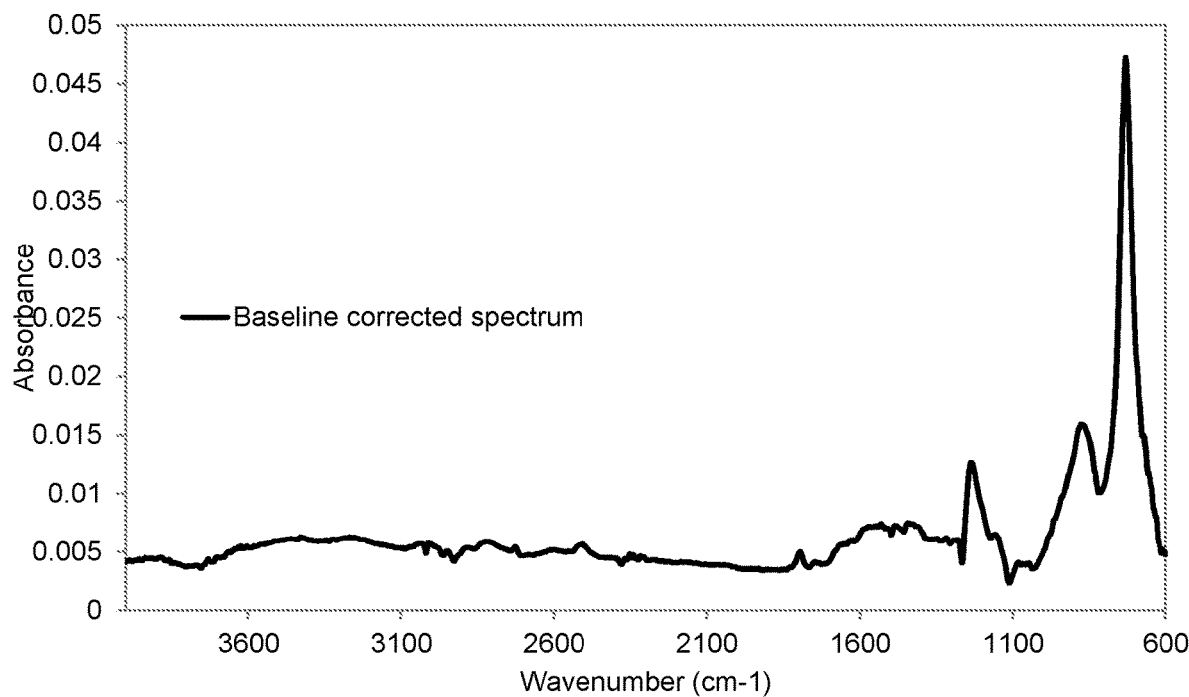
Figure 3.C
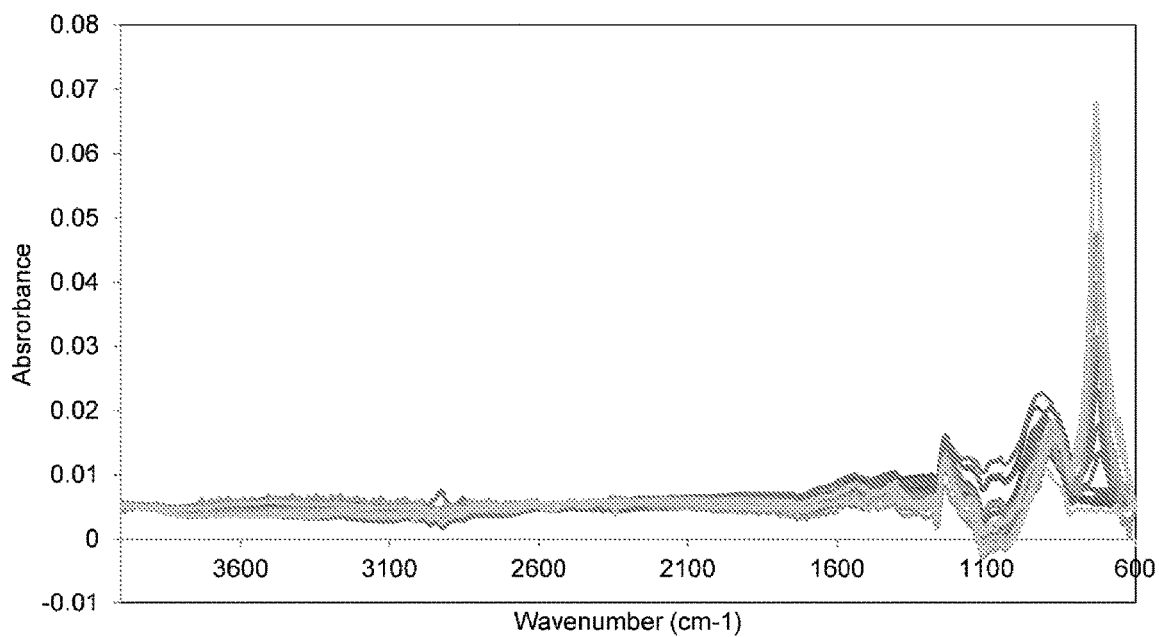
Figure 4

MEASUREMENT OF OXIDE THICKNESS ON ALUMINUM SURFACE BY FTIR SPECTROSCOPY AND CHEMOMETRICS METHOD

FIELD OF INVENTION

The invention relates to a method for on-line thickness measurement of oxide layer formed on Al-containing material at low cost during aluminum-containing material production.

PRIOR ART

Aluminum foil and aluminum Al-containing alloys have some oxide layers on their surface due to their natural structure. In some applications, this oxidation is consciously and regularly augmented by using chemical and electrochemical reactions in the so-called anodization process. But in most cases, the oxidation occurs in an undesired and irregular form with crystallographic structure. Said layer not only contains Al and oxygen (O) components, but in some cases with inclusion of hydrogen (H), it may also have $Al(OH)_3$ content. In Magnesium (Mg) containing Al alloys different oxidation formation shape and structures are observed. The most widely known are MgO and Al—Mg—O spinals. The oxide layers of Mg-containing alloys are brown while the Mg-free oxide layer is gray. Such oxidations are, in most cases, not desirable due to the problems they create in visual quality and some high technology applications of the product and process steps.

Aluminum containing materials mostly go through processes using high temperature in their applications. As a result of annealing or heat treatment, the increased temperature accelerates the reaction with oxygen in the atmosphere and creates an irregular oxide layer.

One of the problems that arise from irregular oxidation is the difficulty encountered in soldering during applications that require brazing. As the oxidation thickness increases, it becomes more difficult to bond the solder to the surface and after a certain point it becomes impossible to reach the desired result.

X-ray photoelectron spectroscopy (XPS) is the most commonly used and known analytical method of measuring said oxide layer. The XPS measurement is performed as follows:

The portion of oxidized or contaminated surface is cut off or partly removed. This surface is irradiated with focused beam of x-rays. When the surface absorbs the X-rays, electron will be ejected from the surface with a specific angle. These ejected electrons which are collected with an electron collection lens, are analyzed by an electron analyzer and a result is obtained.

Although the said XPS technique yields reliable results, it is necessary to implement it in a laboratory environment. Besides that, it is imperative to have qualified personnel in the capacity to carry out this complex action. Due to above challenges brought by this technique, the technique is never implemented or is implemented inadequately by most enterprises, which leads to poor quality products from uncontrolled production.

In the US Patent and Trademark Office document with application no U.S. Pat. No. 5,285,066, An XPS imaging system is mentioned. In the relevant document, it is said that this system gives results with very high accuracy. But this process has a cost, and laboratory environment and qualified personnel are necessary to implement the process.

In Japanese Patent Office document with application no. JP2001348211, the sulfur trioxide quantitative analysis method using an FTIR spectrometer has been mentioned. In this method, quantitative analysis of the components contained inside the material is carried out. The ratio of the components can be determined. With this method, analysis of materials containing shiny surface components such as aluminum cannot be performed as desired because of the baseline shift observed as a result of the analysis.

A portable spectrometer is mentioned in the U.S. Patent and Trademark Office document with reference no. US20110139990. This portable system can measure without the need for a laboratory environment, but the device cannot make measurements on shiny surfaces. Because, on the shiny surface, data being measured is not in a regular state.

As a result, all the above mentioned problems have made it necessary to make an innovation in the relevant field.

BRIEF DESCRIPTION OF THE INVENTION

The invention relates to a measurement method that makes it possible to measure the thickness of the oxide layer on the aluminum production line. The raw data is collected by FTIR spectrometer equipped with a Grazing angle ATR accessory from aluminum on the production line. Acquired data due to aluminum structure can only be acquired with the baseline shifted and curved. The oxide thickness cannot be read from data on an sloped background. By inserting this raw data into a baseline correction algorithm, the slope is removed. The corrected data is inserted into a genetic algorithm based simple least squares calibration method (GASLR) to calculate the result related to the oxide thickness.

OBJECT OF INVENTION

The present invention makes it necessary to remove the above-mentioned problems and to make technical innovation in the relevant field.

The main purpose of the invention is to provide a methodology for on-line thickness measurement of the oxide layer formed on the aluminum sheet and foil at low cost during aluminum-containing material production.

Another object of the invention is to enable the measurement of the oxide layer thickness on the production line. It also speeds up the process by providing rapid on-line measurement capability.

Another object of the invention is to reduce the test cost by taking the oxide thickness measurement out of the laboratory environment and to standardize the test at each production plant with the decreased cost and to increase the frequency of application.

Another object of the present invention, is to eliminate the need for skilled personnel required for the sophisticated test system (XPS) in the prior art.

In order to achieve all objects mentioned above and become evident from the following detailed description, the present invention relates to a method for measuring the thickness of an oxide layer formed on an aluminum foil during aluminum-containing material production. According to this, the method comprises the steps of;
  a) Acquisition of raw data
  b) Importing the raw data into baseline-correction algorithm
  c) applying the calibration
  d) getting results Thus, the oxide thickness on aluminum can be measured precisely and with low cost.

In a preferred embodiment of the invention, raw data is collected by FTIR spectrometry from aluminum. Thus, on-line measurement becomes possible.

In another preferred embodiment of the invention, raw data is acquired from the aluminum production line. Thus, the oxide thickness can be controlled frequently.

In another preferred embodiment of the invention, the baseline correction algorithm into which the raw data is inserted consists of a genetic algorithm and a second order polynomial equation. Thus, the baseline of the raw data could be corrected.

In another preferred embodiment of the invention, the corrected data calibration is applied by using a genetic algorithm based simple least squares calibration method. Thus, the raw data become readable by the user.

BRIEF DESCRIPTION OF THE FIGURES

In FIG. 3.A, the first correction step inserted state of a raw spectrum acquired from aluminum by FTIR system, and the corrected spectrum graphs are given together.

In FIG. 3.B baseline correction graph adapted to the raw spectrum acquired from an aluminum sample by FTIR system is given.

In FIG. 3.0 baseline corrected state graph of the raw spectrum acquired from an aluminum sample by FTIR system is given.

In FIG. 4, baseline corrected state graph of all of the spectra acquired from the aluminum by FTIR system is given.

EXPLANATION OF REFERENCE NUMBERS IN THE FIGURES

100. Raw spectral data acquisition with FTIR system
200. Introducing raw spectral data acquired from the FTIR system into the baseline correction algorithm
300. Acquiring corrected baseline data
400. Introducing the data with corrected baseline into a calibration model prepared by genetic algorithm based method applied to simple least squares (GASLR)
500. Reading the Results

DETAILED DESCRIPTION OF THE INVENTION

In this detailed explanation, the measurement method of the oxide thickness on the aluminum surface by FTIR spectroscopy and chemometrics method which is the subject of invention is described by examples only for the better understanding of the subject and in a way that it will not have any limiting effect.

The invention relates to a method for on-line thickness measurement of the oxide layer formed on aluminum sheet and foil at low cost during aluminum-containing material production.

Figure 1:
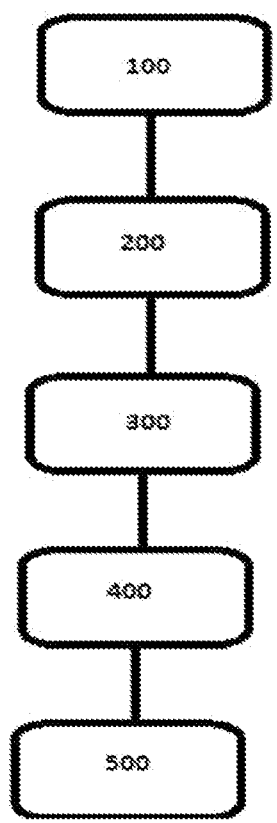
FIG. 1 is a block diagram showing the measurement of the oxide layer in consecutive steps.
Figure 2:
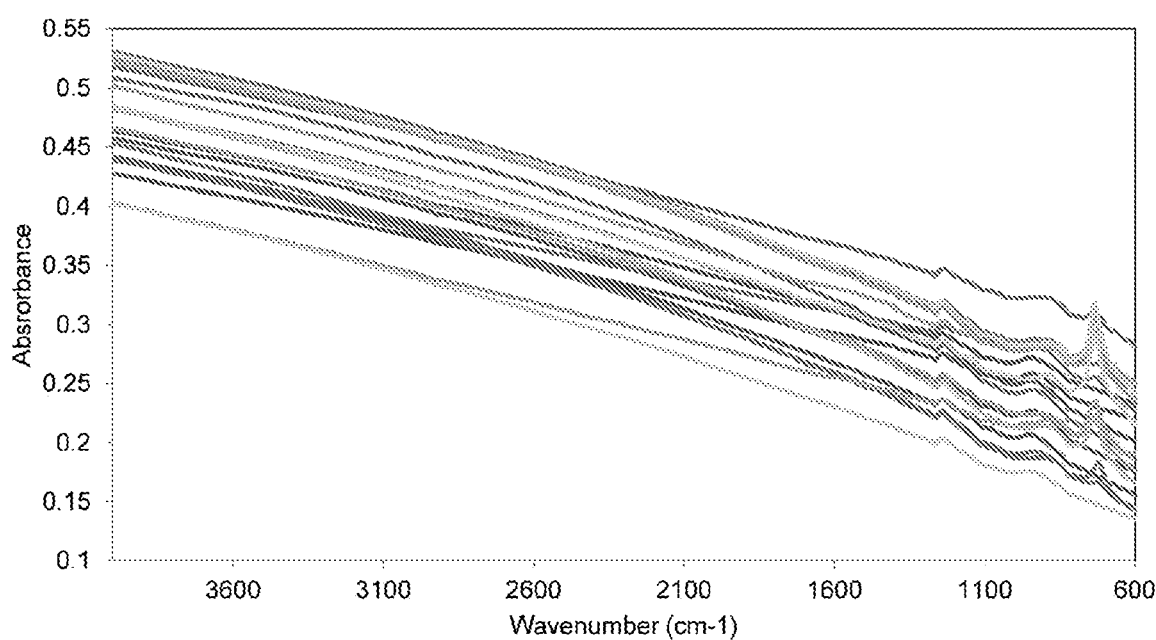
FIG. 2 shows raw spectra graph acquired from aluminum by FTIR system.

FIG. 1 is a block diagram showing the measurement of the oxide layer in consecutive steps. In step 100, using Grazing Angle ATR accessory with FTIR (Fourier Transform Infrared) spectroscopy technique, raw spectra will be acquired by removing reference (background) spectra from sample spectra (aluminum plates and foils). FIG. 2 shows a raw spectrum data graph acquired from aluminum by using the FTIR technique. As can be seen in FIG. 2, Depending on the shiny surface of the aluminum and the surface structure formed by rolling, considerable shifts occur on the baseline of the spectra acquired.

In step 200, the raw FTIR spectral data with shifted baseline are inserted into baseline shift correction algorithm. This algorithm is different from the FTIR spectrometer built in standard baseline correction algorithm. Determining the most suitable reference points (The number of selected points may vary depending on the nature of the genetic algorithm) with a genetic algorithm (GA) developed for this problem through a raw spectrum which is inserted into a baseline shift correction algorithm is carried out from a second order polynomial equation. The modification of raw data shown in FIG. 2 after inserting into a genetic algorithm and a second-order polynomial equation is shown in FIG. 3.a, FIG. 3.b and FIG. 3.c, respectively.

As a result of step 300, baseline corrected spectral data are obtained for all the samples. In FIG. 4, baseline correction algorithm inserted state of spectra graph acquired from aluminum is given.

In step 400, a calibration modeling prepared by genetic-based simple least squares calibration (GASLR) method is applied on baseline corrected data In step 500, the results of the operations performed in step 400 are being taken.

EXAMPLES

The example describes the measurement of thickness of oxide layers formed on samples taken from annealing at different temperatures and the verification of their consistency by comparing these measurements with the measurements made by the XPS system.

In the example, the weight percent composition of basic alloying elements content of the aluminum-containing material showing the oxidation reaction of aluminum oxide ($Al_2O_3$) and magnesium oxide (MgO) used for the demonstration of the measurement method using "FTIR spectroscopy and the chemometrics method" to determine the oxide thickness on the aluminum-containing material is as shown in Table 1.

TABLE 1

| Si (w/w %) | Fe (w/w %) | Mn (w/w %) | Mg (w/w %) |
| --- | --- | --- | --- |
| 0.32 | 0.65 | 1.32 | 0.35 |

As the temperature increases in the annealing process, the MgO layer also starts to form besides $Al_2O_3$. Therefore, one sample which is not included in the annealing process and 20 samples which were annealed at different temperatures and different times were taken as basic samples.

The samples taken were subjected to annealing for 1, 3, 5, and 8 hours and 300° C., 350° C., 400° C., 450° C., and 500° C. temperatures in the form of variations as shown in Table 2 and Table 3 along with reference oxide thickness measurements. The resultant MgO and $Al_2O_3$ layer thicknesses were measured by the XPS system. The measured values are given in Table 2 for $Al_2O_3$ and in Table 3 for MgO in the units of nanometers (nm).

TABLE 2

$Al_2O_3$ thickness (nm)

| Annealing Temperature, ° C. | Annealing Time (hour) | | | |
|---|---|---|---|---|
| | 1 hour | 3 hours | 5 hours | 8 hours |
| 300 | 4.4 | 4.8 | 5.1 | 5.4 |
| 350 | 4.8 | 5.1 | 5.3 | 5.6 |
| 400 | 8.0 | 12.0 | 16.0 | 18.0 |
| 450 | 14.0 | 17.0 | 20.0 | 22.0 |
| 500 | 15.0 | >15 | >15 | >15 |

TABLE 3

MgO thickness (nm)

| Annealing Temperature (° C.) | Annealing Time (hour) | | | |
|---|---|---|---|---|
| | 1 hour | 3 hours | 5 hours | 8 hours |
| 300 | 1.4 | 2.4 | 2.7 | 3.0 |
| 350 | 2.0 | 5.0 | 7.0 | 10.0 |
| 400 | 16.0 | 20.0 | 25.0 | 30.0 |
| 450 | 20.0 | 24.0 | 28.0 | 36.0 |
| 500 | 25 | >15 | >15 | >15 |

For the last 3 values in Table 2 and Table 3, since the XPS analysis period was too long, the exact thickness measurement could not be made.

In order to compare with the measured values in the XPS system, measurement of oxide thickness on aluminum surface by "Grazing angle ATR-FTIR Spectroscopy and chemometric method" is applied on the same samples. As the first step of this method, thickness modeling by FTIR spectroscopy is performed based on reference values form XPS. The raw spectrum values from this modeling are shown in FIG. 2.

The raw spectrum shown in FIG. 2 can only be used after baseline correction due to shiny surface structure of aluminum. The baseline is corrected by fitting a second order polynomial function and a genetic algorithm to the raw data with shifted baseline. FIG. 3.A and FIG. 3.B shows the first and second correction steps inserted states of raw spectrum acquired from aluminum by FTIR system. FIG. 3.0 shows the baseline corrected state of raw spectrum one of the samples for illustration purpose.

The graph of the baseline corrected state of all of the spectra taken from the aluminum samples used for modeling with the FTIR system is given in FIG. 4.

After applying said baseline correction to all spectra used in modeling, the corrected spectra obtained are inserted into the simple least squares calibration method (GASLR) guided by a genetic algorithm together with reference oxide thickness information coming from XPS analysis and the results are obtained.

Using the generated GASLR models, the oxide thicknesses of samples without reference XPS data are calculated in terms of both aluminum oxide and magnesium oxide.

Figure 5:
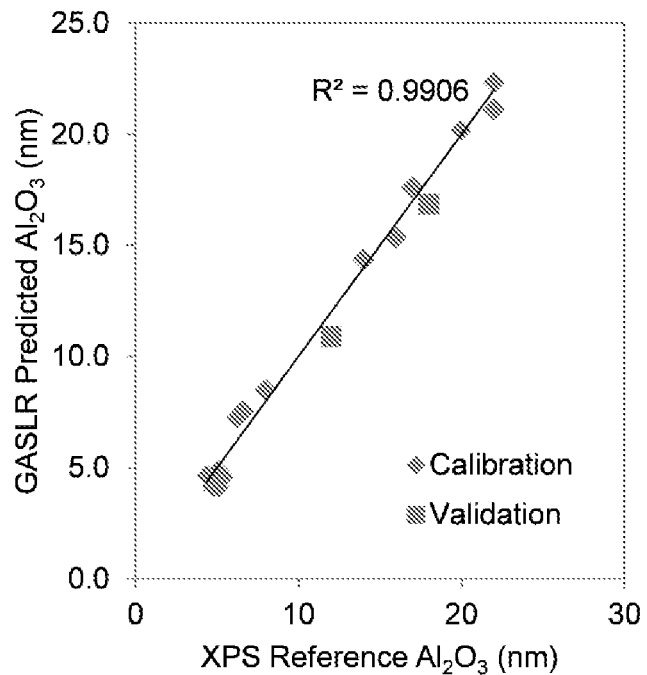
In FIG. 5, Correlation graph of GASLR predictions of $Al_2O_3$ thickness compared with XPS reference analysis results is given.
Figure 6:
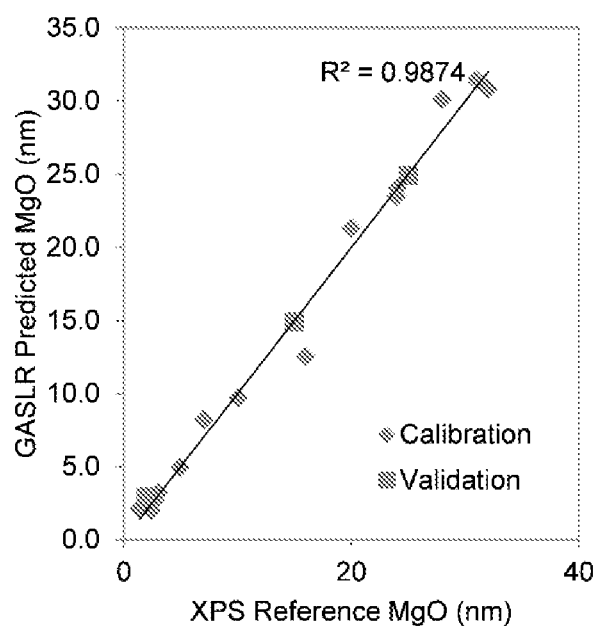
In FIG. 6 Correlation graph of GASLR predictions of MgO compared thickness with XPS reference analysis results is given.

Correlation graphs of GASLR predictions of $Al_2O_3$ and GASLR predictions of MgO compared with XPS results are shown in FIG. 5 and FIG. 6 respectively.

Comparison of XPS results by GASLR algorithm predictions with accurate XPS measurements of 17 samples are shown in Table 4.

TABLE 4

| Calibration Set Samples | | Calibration Set Samples | |
|---|---|---|---|
| XPS $Al_2O_3$ (nm) | FTIR-GASLR $Al_2O_3$ (nm) | XPS MgO(nm) | FTIR-GASLR MgO (nm) |
| 4.4 | 4.7 | 1.4 | 2.1 |
| 4.8 | 4.2 | 2.4 | 1.9 |
| 5.1 | 4.2 | 2.7 | 2.7 |
| 5.4 | 4.6 | 3 | 3.2 |
| 5.1 | 4.9 | 5 | 4.9 |
| 6.3 | 7.3 | 7 | 8.2 |
| 6.6 | 7.5 | 10 | 9.7 |
| 8 | 8.5 | 16 | 12.6 |
| 16 | 15.3 | 24 | 23.5 |
| 14 | 14.3 | 20 | 21.3 |
| 17 | 17.6 | 24 | 24.0 |
| 20 | 20.2 | 28 | 30.1 |
| 22 | 21.1 | 32 | 30.8 |
| 22 | 22.3 | 31 | 31.4 |
| Independent Validation Set Samples | | Independent Validation Set Samples | |
| XPS $Al_2O_3$ (nm) | FTIR-GASLR $Al_2O_3$ (nm) | XPS MgO(nm) | FTIR-GASLR MgO (nm) |
| 4.8 | 4.4 | 2 | 2.9 |
| 12 | 10.9 | 15 | 14.9 |
| 18 | 16.9 | 25 | 24.9 |

The estimates made by the GASLR algorithm for the remaining 3 samples without XPS measurements are shown in Table 5.

TABLE 5

| No | FTIR-GASLR $Al_2O_3$ (nm) | FTIR-GASLR MgO (nm) |
|---|---|---|
| 18 | 25.0 | 42.2 |
| 19 | 26.0 | 37.1 |
| 20 | 26.1 | 35.9 |
| 21-(unannealed) | 5.4 | 0.9 |

The standard error of calibration cross-validation (SECV) values for oxide thicknesses predicted using the GASLR method and the standard error of Prediction (SEP) values for the validation set were found to be 0.67 nm and 0.94 nm for $Al_2O_3$, respectively. On the other hand, SECV and SEP values for MgO are 1.29 nm and 0.54 nm.

The invention claimed is:
1. A method for measuring a thickness of an oxide layer formed on an aluminum-containing alloy on a production line, the method comprising:
   providing a plurality of samples, the plurality of samples having the oxide layer formed on the aluminum-containing alloy as taken from annealing at different temperatures;
   measuring the thickness of the oxide layer of some of the plurality of samples using x-ray photoelectron spectroscopy (XPS);
   acquiring raw spectrum data of absorbance by the plurality of samples using Fourier Transform Infrared (FTIR) spectroscopy;
   correcting the acquired raw spectrum data by using a baseline correction algorithm, the baseline correction algorithm having a genetic algorithm and a second order polynomial equation;
   generating Genetic Algorithm Simple Least Square (GASLS) models by applying a least squares calibra- tion method guided by the genetic algorithm together with reference oxide thickness information on the corrected raw spectrum data, the reference oxide thickness information obtained from the measured oxide layer thickness from the XPS system; and
determining the thickness of the oxide layer on the aluminum-containing alloy on the production line by using the GASLS models.

* * * * *